United States Patent [19]

Uda et al.

[11] Patent Number: 4,489,033
[45] Date of Patent: Dec. 18, 1984

[54] PROCESS FOR INJECTION COMPRESSION MOLDING

[75] Inventors: Naotake Uda, Yamaguchi; Yasuo Kouno, Iwakuni; Tadayoshi Shiomura, Yamaguchi, all of Japan

[73] Assignee: Mitsui Petrochemical Industries, Tokyo, Japan

[21] Appl. No.: 367,286

[22] Filed: Apr. 12, 1982

[30] Foreign Application Priority Data

Apr. 14, 1981 [JP] Japan .................................. 56-55011

[51] Int. Cl.³ .............................................. B29F 1/06
[52] U.S. Cl. ............................................... 264/328.7
[58] Field of Search ..................................... 264/328.7

[56] References Cited

U.S. PATENT DOCUMENTS 4,091,057 5/1978 Weber ........................ 264/328.7 X

FOREIGN PATENT DOCUMENTS 51-81861 7/1976 Japan .

OTHER PUBLICATIONS

SPE Journal, "Injection Stamping—A Special Process for the Production of Large Injection Molded Articles", Apr. 1968, vol. 24, pp. 61–63.

Primary Examiner—Thomas P. Pavelko
Attorney, Agent, or Firm—Wyatt, Gerber, Shoup, Scobie, and Badie

[57] ABSTRACT

A process for injection compression molding ultra high molecular weight polyethylene having an intrinsic viscosity of 3 dl/g or higher measured at 135° C. in decalin and a melt index of 0.01 g/10 min or less comprises, (a) heating the ultra high molecular weight polyethylene to 170°–240° C.,
(b) adjusting the volume of the mold cavity $V_1$ equal to the volume of the molded article $V_0$,
(c) injecting ultra high molecular weight polyethylene having a volume $V_0$ into the mold cavity through a runner portion at a shear rate of at least 20,000 sec$^{-1}$,
(d) instantaneously expanding the mold cavity to adjust its volume $V_1$ to satisfy the relation:

$$1.2 V_0 \leqq V_1$$

at a time from $T_1$ (immediately before completion of injection) and a time $T_2$ (after completion of injection while there is a pressure difference between the cavity and the runner portion, and the ultra high molecular weight polyethylene in the runner portion being solidified), and
(e) compressing the volume of the mold cavity $V_1$ to satisfy the relation:

$$V_1 = V_0$$

while the ultra high molecular weight polyethylene in the mold cavity is still in a molten state.

7 Claims, 5 Drawing Figures

PROCESS FOR INJECTION COMPRESSION MOLDING

BACKGROUND OF THE INVENTION

Field of the Invention

This invention relates to a process for injection compression molding ultra high molecular weight polyethylene of low melt fluidity.

Ultra high molecular weight polyethylene are so excellent in impact strength, abrasion resistance, self-lubricating property, chemical resistance and the like that they are widely used as engineering plastics. However, these resins have much higher melt viscosity and poorer fluidity than ordinary thermoplastic resins, and therefore, it is very difficult to shape these resins by conventional extrusion molding, injection molding or injection compression molding. As a result, these resins are usually shaped by compression molding or sintering molding, but the working efficiency is so poor that a shaping method having a short shaping cycle is desired and needed.

When ultra high molecular weight polyethylene is heated to an elevated temperature to reduce the melt viscosity and ordinary injection molding is effected, the molecular weight of the resin is lowered by thermal degradation, and therefore, the resulting shaped article is not practical because the inherent excellent properties are deteriorated.

On the other hand, there are so-called "injection compression molding methods" in which a resin is injected into a mold and then compressed. There may be mentioned the method in which, during injection of a plastic material into a cavity of a closed split mold, the cavity of said split mold is slightly expanded and after completion of the plastic material, the split mold is compressed to reduce the cavity of the mold (Japanese Patent Publication No. 1664/1965); a method in which a small gap is preliminarily formed between molds, a resin material is injected the gap is maintained until the injection is complete, and the material on the mold cavity surface is compressed and shaped simultaneously with completion of the injection (Japanese Patent Laid-Open No. 14657/1977), a method in which a cavity is filled by injecting at a high speed a molten thermoplastic resin having the same volume as a preliminarily determined cavity volume and then the resin of a volume of 0.5–3 times the cool shrinkage volume of said molten resin injected at a high speed is additionally injected at a low speed to open the mold followed by mold-closing accompanying cooling and solidifying of the molten resin in the mold (Japanese Patent Laid-Open No. 21258/1978) other methods are known.

These methods are all concerned with molding of ordinary thermoplastic resins. When these methods are employed for injection molding of thermoplastic resins of poor melt fluidity, in particular, to produce many pieces by one shot, articles molded according to the methods of the above mentioned Japanese Patent Publication No. 1664/1965 or Japanese Patent Laid-Open No. 21258/1978 suffer from layer-like exfoliation. Japanese Patent Laid-Open No. 14657/1977, also identified above is concerned with a method of the production of a large number of thin articles by one shot using ordinary thermoplastic resins. When this method is used for the purpose of the present invention, weights and shapes of the molded aritcles vary to a great extent resulting in production of poor articles.

In order to improve the molding methods, there was proposed a process for injection molding ultra high molecular weight polyethylene which comprises injecting the polyethylene into a mold cavity having a volume 1.5–3.0 times that of the injected polyethylene at a shear rate of at least 50,000 sec.$^{-1}$ measured at the gate of the injection nozzle and then compressing the mold cavity to a volume less than twice that of the injected polyethylene (Japanese Patent Laid-Open No. 81861/1976). This process enables ultra high molecular weight polyethylene to be injection-molded for the first time. This process gives molded articles of good quality and appearance when used for producing one piece by one shot, but gives molded articles which fluctuate in weight and shape when used for producing many pieces by one shot. In order to obtain molded articles free from such fluctuations using the above mentioned process, it is necessary to make the runner distance and volume the position of gate uniform. However, such molds are difficult to obtain by manufacture according to the design drawing. They can be obtained only by improving the runner, gate or the whole design of the mold by trial and error. Further, it is very difficult to produce large numbers of the same mold.

SUMMARY OF THE INVENTION

An object of the present invention is to provide an injection compression molding process capable of producing molded articles having high impact strength, high abrasion resistance, good appearance, uniform weight and shape, and other desirable characteristics.

According to the present invention, there is provided a process for injection compression molding ultra high molecular weight polyethylene having an intrinsic viscosity of at least 3 dl/g or higher measured at 135° C. in decalin and a melt index of up to 0.01 g/10 min which comprises, (a) heating the ultra high molecular weight polyethylene to 170°–240° C., (b) adjusting the volume of the mold cavity $V_1$ to be equal to the volume of the molded article $V_0$, (c) injecting ultra high molecular weight polyethylene having a volume $V_0$ into the mold cavity through a runner portion at a shear rate of at least 20,000 sec.$^{-1}$, (d) instantaneously expanding the mold cavity to adjust its volume $V_1$ satisfy the relation:

$$1.2\ V_0 \leqq V_1$$

at a time from $T_1$ (immediately before completion of injection) to a time $T_2$ (after completion of injection while there is a pressure difference between the cavity and the runner portion, and the ultra high molecular weight polyethylene in the runner portion has not solidified), and (e) compressing the volume of the mold cavity $V_1$ to satisfy the relation:

$$V_1 = V_0$$

while the ultra high molecular weight polyethylene in the mold cavity is still in a molten state.

DESCRIPTION OF THE PREFERRED EMBODIMENT

Figure 1:
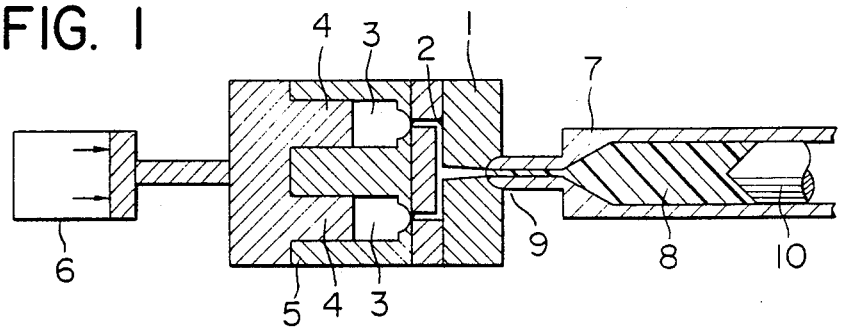
FIGS. 1–4 show diagrammatically an embodiment of an injection molding apparatus for carrying out the process of the present invention, and show a state before injection, a state of injection, a state where the cavity is expanded after injection and a state where the cavity is compressed again after the expansion of the cavity, respectively.

Ultra high molecular weight polyethylene has a molecular weight far higher than usual polyethylene for molding and is particularly characterized by its difficult molding characteristics. It may be produced by Ziegler polymerization.

The present invention is useful with all of the ultra high molecular weight polyethylene, preferably ultra high molecular weight polyethylene having an intrinsic viscosity $[\eta]$ measured in decalin at 135° C. of 3 dl/g or higher, particularly, 10 dl/g or higher, and a melt index (ASTM D 1238F) of 0.01 g/10 min or less.

The injection temperature is not critical, as long as it is at least higher than the melting point of the ultra high molecular weight polyethylene and lower than its decomposition temperature.

Ultra high molecular weight polyethylenes having $[\eta]$ of 10 dg/g or higher have remarkably low fluidity in the molten state, and the fluidity is not changed appreciably with changes in temperature. Therefore, a fairly wide range of injection temperatures, for example, from 150° to 300° C., may be employed. However, for the purpose of injecting molten ultra high molecular weight polyethylene in a form of fine and uniform powder into a cavity, it is preferable to employ a relatively low temperature, for example, from 170° to 240° C. In the case of ultra high molecular weight polyethylene having $[\eta]$ of 3–10 dl/g, it has been observed that at a too high temperature the melt fluidity of the polyethylene increases to the point where it sometimes becomes difficult to fill the mold cavity with finely divided and uniform powder-like molten polyethylene. Therefore, it is most preferable to employ a low injection temperature such as 170°–200° C.

The first feature of the injection compression molding process of the present invention is that the polyethylene material is injected into a cavity in the powder-like form at a state that the material is molten, but is of less fluidity. Upon injecting the molten material into the cavity in a powder-like form, it is necessary to pour it at a high shear rate. The shear rate at a pouring port where pouring occurs in a powder-like form is affected by the injection temperature. For example, when $[\eta]$ of the ultra high molecular weight polyethylene is 10 dl/g or higher, powder-like filling can be effected by injecting at an injection temperature of 200° C. at a shear rate of 20,000 sec$^{-1}$ or higher, or at an injection temperature of 250° C. at a shear rate of 22,000 sec$^{-1}$ or higher. For the purpose of filling in a better finely divided state, it is preferable to inject at a shear rate of 50,000 sec$^{-1}$ or higher.

The second feature of the present invention is that the mold cavity expanding and compression time and the expanding and compression amount are specified. That is, upon expanding the mold cavity, a melt of the polyethylene having the same volume as the volume of the molded article ($V_0$) to be produced is injected into a cavity having a volume ($V_1$) which is the same as $V_0$, and the cavity should be expanded instantaneously within a period of time from a time $T_1$ (immediately before completion of injection) and a time $T_2$ (after completion of injection and while a pressure difference is present between the cavity and a runner portion, and the polyethylene in the runner portion is not yet solidified). When the mold cavity is expanded outside of the above mentioned period of time, any good molded articles can not be produced. For example, when injection is effected where the cavity is preliminarily expanded, or the cavity is expanded while injecting the molten ultra high molecular weight polyethylene, the molded articles produced have different weights and shapes.

When the cavity is expanded at a time when the pressure difference between the cavity and the runner portion disappears, the resulting molded articles have uniform weight and shape, but layer-like exfoliation occurs so that the abrasion resistance is poor.

The degree of expansion of the cavity is at least 1.2 times, preferably at least 1.4 times the original cavity volume ($V_1$). The upper value is not limited, but if the amount of expansion is too high, it is required to make the size of the mold undesirably large. Therefore, it is preferable that the amount of expansion is about twice the original cavity volume.

According to the present invention, the ultra high molecular weight polyethylene in the runner portion can be introduced into a cavity in a powder-like form by expanding the mold cavity instantaneously at a time between $T_1$ and $T_2$ so as to make the cavity volume the above mentioned volume. As a result, there are obtained molded articles which have uniform weight and shape, are free from a tendency of layer-like exfoliation and have excellent abrasion resistance.

In the present invention, the time $T_1$ is a time for injection which can be easily determined based on the time of the advancing stroke of the screw in the injection cylinder. On the other hand, the time $T_2$ varies depending upon melting point of the polyethylene, injection temperature, molding temperature and injection time, but can be determined by the following experiment.

The higher the melting point of the polyethylene, the shorter the period of time between $T_1$ and $T_2$. The higher the injection temperature and the mold temperature, the longer said period of time. Said period of time is naturally short when the injection time is short. Thus, the state in which the polyethylene is introduced into the cavity is observed by varying the period of time during which the mold cavity is expanded after completion of injection while the above mentioned conditions are kept constant.

When this time exceeds $T_2$, the polyethylene introduced into the portion near the gate of the cavity forms a mass.

On the contrary, when this time does not exceed $T_1$, the polyethylene present near the gate of the cavity and at all other portions can be maintained in a powder-like form. In this way, the time $T_2$ can be easily determined by conducting experiments at various cavity expansion times under constant conditions except for cavity expansion time.

In injection molding, there remains a pressure difference between the runner portion and the cavity even after completion of injection, and therefore, even if the cavity volume remains $V_1$, this pressure difference permits introduction of the polyethylene from the runner portion into the cavity. When the pressure difference disappears, the introduction of the polyethylene at the runner portion into the cavity stops.

However, the polyethylene introduced into a portion near the gate at the above mentioned state is in a form of mass. Once polyethylene becomes mass, the resulting molded articles show layer-like exfoliation no matter how intensively the mass may be compressed.

On the contrary, according to the present invention, the mold cavity expansion is effected instantaneously when the polyethylene in the gate and runner has not yet been solidified, and the resulting rapid decrease in pressure in the cavity permits the introduction of polyethylene in the runner into the cavity in a powder-like form. As a result, the formation of mass of polyethylene at a portion near the gate can be prevented while simultaneously with releasing nonuniform stress distribution in the cavity. Therefore, undesirable layer-like exfoliation of the molded articles can be effectively eliminated.

According to the present invention, the relationship between the mold temperature and the time $T_1$ can be also obtained by conducting experiments similar to those as mentioned above with changing the mold temperature only while keeping the other conditions including the mold opening time constant. This is also the case with respect to the relationship between the time $T_1$ and other conditions such as injection temperature, injection time and melting point of the polyethylene.

In general, it is desirable to effect the mold cavity expansion immediately after completion of injection.

In case of expanding the cavity up to 1.2 or more times the original cavity volume and then compressing the cavity volume to $V_1$, the compression is effected at a time from the time of injection of powder-like molten polyethylene into the cavity and the time before the powder-like molten polyethylene thus filled in the cavity is solidified.

Since the process of the present invention is concerned with a molding method by compressing powder-like molten polyethylene filled into a cavity, it is preferable that the mold is heated so as to prevent the injected powder-like molten polyethylene from solidifying too quickly. However, if the mold temperature is too high, the molding time becomes very long. Therefore, the upper limit of mold temperature is preferably lower than the melting point of polyethylene by 10° C., more preferably, lower than that by 20° C. For example, when ultra high molecular weight polyethylene is used, the mold temperature is preferably 60°–120° C., more preferably 80°–120° C.

Any conventional mold with a direct pressure mold clamping system may be used. If a toggle type mold clamping system is employed, one having an assisting mold used for the compression is preferable.

Upon molding, the amount of the polyethylene corresponding to the weight of the molded article is measured by a measuring device of an injection unit, and the measured amount of the polyethylene is injected into a cavity having a volume ($V_1$) which is the same as the volume ($V_0$) of the molded article in a powder-like form. If the runner is a cold runner, the amount of the polyethylene to be injected should be the sum of the above mentioned $V_1$ and the volume of the runner portion. If the runner is a hot runner, the amount of the polyethylene to be injected may be the same as $V_1$. According to the present invention, the cavity is opened up to at least 1.2 times, preferably at least 1.4 times, the original volume of the cavity at a time from $T_1$ and $T_2$ as mentioned above, and then the mold cavity is compressed to $V_1$ to finish the molding. This molding process produces injection molded articles of ultra high molecular weight polyethylene which have high mechanical and impact strength, good adhesion resistance and uniform weight and shape. Naturally the process of the present invention can produce an injection molded articles of high mechanical strength even when used for producing one piece of article (by one shot).

The ultra high molecular weight polyethylene used in the present invention may be compounded with other conventional additives by conventional procedures.

Such additives include anti-oxidants, heat-stabilizers, ultraviolet ray absorbers, lubricants, nucleating agents, anit-static agents, fire-retardants, pigments, dyes, inorganic or organic fillers and the like.

The process of this invention permits the production of molded articles of high precision which are suitable for various machine parts, industrial parts, casing, vessels, domestic articles, spinning machine parts, civil engineering machines, articles for leisure and the like.

The following examples are given for the purpose of illustration and not by way of limitation.

EXAMPLE

Figure 2:
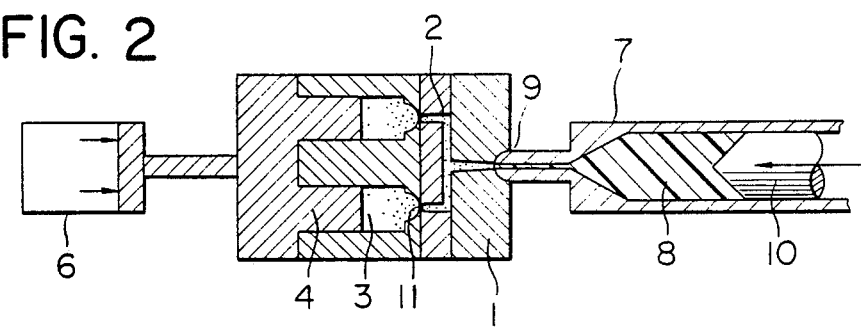
Figure 3:
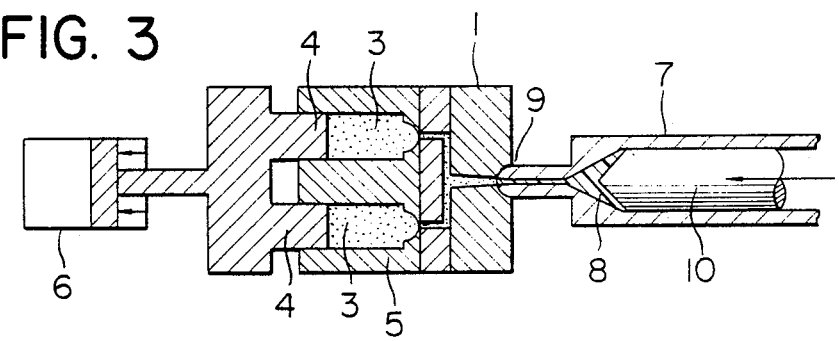
Figure 4:
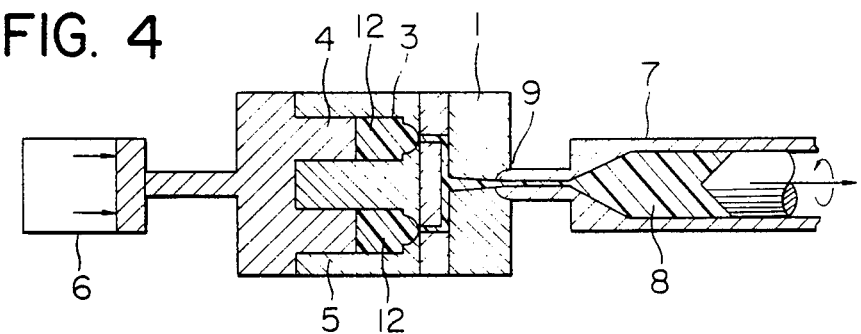

FIGS. 1–4 show diagrammatically an embodiment of an injection molding apparatus. FIG. 1 shows a stage before injection; FIG. 2 shows a state of injection; FIG. 3 shows a state where the cavity is expanded after injection; and FIG. 4 shows a state where the cavity is compressed again after the expansion of the cavity.

There was used an injection molding machine (V44-200 type, tradename, manufactured by NIHON SEIKOSHO K.K.) having a mold for molding bearings (4 pieces of bearing; weight—12 g/piece; runner portion, 12 g; total 60 g) comprising a fixed mold 1 provided with a runner 2, a moving mold 5 provided with a cavity 3, and a core mold 4 connected with a core moving device 6. The ultra high molecular weight polyethylene employed was an ultra high molecular weight polyethylene having a melt index of 0.01 g/10 min or less and [η] of 16.7 dl/g ("HI-ZEX MILLION 240M", tradename, supplied by Mitsui Petrochemical Industries, Ltd.). The ultra high molecular weight polyethylene molten in an injection cylinder 7 was measured at a measuring portion 8. The measured volume of the polyethylene was equal to the sum of the volume of cavity 3 and that of runner 2. (FIG. 1)

Then a screw 10 was moved to inject the ultra high molecular weight polyethylene in measuring portion 8 into the mold through a nozzle 9. The polyethylene was injected into cavity 3 through runner 2 and gate 11 in a powder-like form. (FIG. 2)

After all of the polyethylene in measuring portion 8 was injected into the mold, core 4 was moved by core moving device 6 to expand cavity 3 and inject the polyethylene in runner 2 into cavity 3 while there is still a pressure difference between runner 2 and cavity 3. (FIG. 3)

Then, core 3 is moved to the original position to compress the polyethylene resulting in production of a molded article 12 (bearing). During the above procedure, screw 10 was retreated to measure the ultra high molecular weight polyethylene for the subsequent molding. (FIG. 4)

Following the above procedures, molding experiments were made under various conditions. The results are shown in Tables 1, 2 and 3 (infra).

Physical properties of the resulting molded articles were evaluated as shown below. Layer-like exfoliation:

The tip of a molded article is cut with a knife. The following four step evaluation is made.
1 ... The surface is easily exfoliated;
2 ... The surface is slightly exfoliated;
3 ... The surface is hardly exfoliated; and
4 ... No exfoliation occurs.

Appearance:
The surface state of the molded article is observed by eyes.

Fluctuation of weight:
Weight of each molded article is measured.
Fluctuation among 4 pieces of molded articles, $$\sigma_A (\%) = 100 \times \frac{(\text{Maximum weight} - \text{Minimum weight})}{\text{Average weight}},$$

in case of 4 piece production by one shot.
Fluctuation among 10 shots of molded article in the same cavity, $$\sigma_B (\%) = 100 \times \frac{(\text{Maximum weight} - \text{Minimum weight})}{\text{Average weight}}.$$

Table 1 below shows the results when molding was effected with various molding temperatures. Molding conditions were as shown below.

| Injection time | 1.3 sec |
|---|---|
| $t_1$ | 2 sec |
| Shear rate | 69000 sec$^{-1}$ |
| Injection temperature | 200° C. |
| Cavity expansion | 1.73 times |
| $t_2$ | 3.2 sec |

In the present inention, "$t_1$" denotes a period of time from starting injection to starting cavity expansion (starting core retreat) and "$t_2$" denotes a period of time from starting cavity expansion to starting cavity compression (starting core advance).

TABLE 1

| Run No. | Mold temperature (°C.) | Layer-like exfoliation | Appearance | Fluctuation of weight $\sigma_A$ (%) | $\sigma_B$ (%) |
|---|---|---|---|---|---|
| 1 | 30 | 1 | poor | 1.61 | 1.74 |
| 2 | 50 | 1 | poor | 1.60 | 1.72 |
| 3 | 60 | 2 | poor | 1.55 | 1.70 |
| 4 | 70 | 2 | poor | 1.52 | 1.65 |
| 5 | 80 | 3 | good | 1.50 | 1.65 |
| 6 | 90 | 4 | good | 1.40 | 1.60 |
| 7 | 100 | 4 | good | 1.38 | 1.60 |

Apart from the above mentioned experiments in Table 1, the filling stage of the ultra high molecular weight polyethylene in the cavity after cavity expansion was investigated. In run Nos. 1-4, formation of mass of the ultra high molecular weight polyethylene was observed near the gate. In run No. 5, formation of the mass was hardly observed. In run Nos. 6-7, powder-like ultra high molecular weight polyethylene was uniformly filled in the cavity.

Table 2 shows results of experiments where the mold temperature was 100° C. and the expansion degree, i.e. the ratio of the volume of cavity to the volume of molded article ($V_1/V_0$) was variously changed.

| Injection time | 1.3 sec |
|---|---|
| $t_1$ | 2 sec |
| Shear rate | 69,000 sec$^{-1}$ |
| Injection temperature | 200° C. |
| Mold temperature | 100° C. |
| $t_2$ | 3.2 sec |

TABLE 2

| Run No. | Cavity expansion (times) | Layer-like exfoliation | Appearance | Fluctuation of weight $\sigma_A$ (%) | $\sigma_B$ (%) |
|---|---|---|---|---|---|
| 8 | 1.42 | 4 | good | 1.35 | 1.45 |
| 9 | 1.30 | 3 | good | 1.31 | 1.15 |
| 10 | 1.17 | 1 | good | 1.32 | 0.95 |
| 11 | No expansion | 1 | good | 1.30 | 0.60 |

Table 3 shows results of experiments where the injection time was 1.3 sec and $t_1$ was changed.

| Injection time | 1.3 sec |
|---|---|
| Shear rate | 69,000 sec$^{-1}$ |
| Injection temperature | 200° C. |
| Mold temperature | 100° C. |
| $t_2$ | 3.2 sec |
| Cavity expansion | 1.73 times |

TABLE 3

| Run No. | $t_1$ (sec) | Cavity expansion Degree of filling cavity (%) | Layer-like exfoliation | Appearance | Fluctuation of weight $\sigma_A$ (%) | $\sigma_B$ (%) |
|---|---|---|---|---|---|---|
| 12 | 0.5 | 38 | 4 | good | 4.00 | 6.00 |
| 13 | 1.0 | 77 | 4 | good | 3.00 | 5.02 |
| 14 | 1.3 | 100 | 4 | good | 1.42 | 1.63 |
| 15 | 2.0 | 100 | 4 | good | 1.40 | 1.60 |
| 16 | 3.0 | 100 | 4 | good | 1.44 | 1.65 |
| 17 | 5.0 | 100 | 1 | good | 1.45 | 1.52 |
| 18 | 7.0 | 100 | 1 | good | 1.30 | 1.40 |
| 19 | Expanded to 1.73 times from the beginning | | 3 | poor | 5.70 | 6.20 |

Apart from the above mentioned experiments in Table 3, the filling state of the ultra high molecular weight polyethylene in the cavity was investigated after cavity expansion. In run Nos. 12-16, all the polyethylene was filled in a powder-like form. In run Nos. 17-18, some mass formation was observed near the gate.

Figure 5:
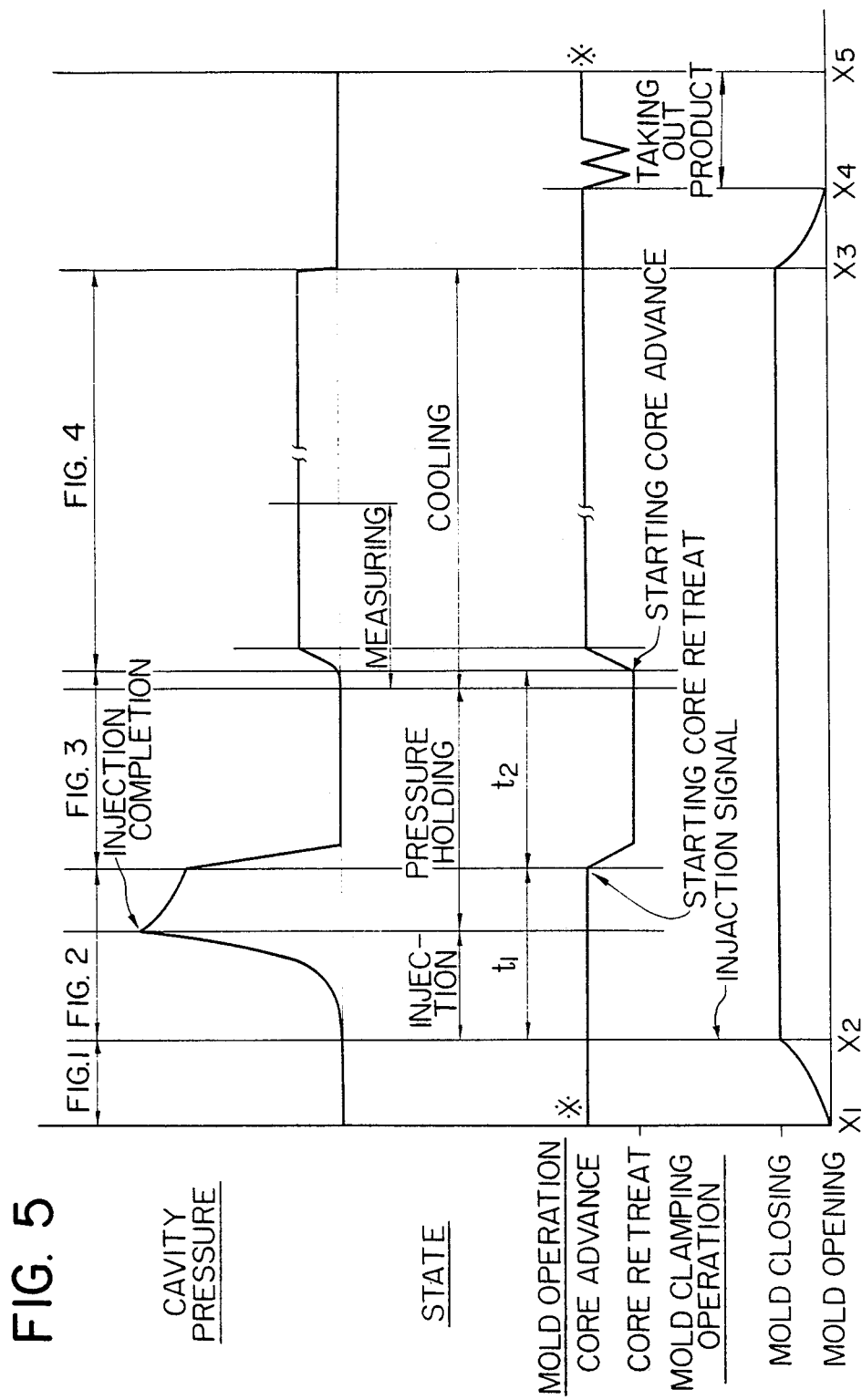
FIG. 5 shows an example of the molding cycle according to the process of the present invention.

FIG. 5 shows an example of the molding cycle according to the present invention. There are illustrated change of cavity pressure, mold operation (moving of cavity core), and mold clamping operation as the molding cycle (injection, pressure holding, cooling and measuring) proceeds.

$X_1$–$X_5$ in FIG. 5 indicate the operation procedures as follows.
$X_1$: Starting mold closing
$X_2$: Completion of mold closing
$X_3$: Starting mold opening
$X_4$: Completion of mold opening
$X_5$: Starting mold closing.

The mark ✲ at the right side continues to the same mark at the left side, that is, a new cycle starts.

We claim:
1. A process for injection compression molding ultra high molecular weight ployethylene having an intrinsic viscosity of at least 3 dl/g measured at 135° C. in decalin and a melt index of up to 0.01 g/10 min which comprises, (a) heating ultra high molecular weight polyethylene to 170°–240° C., (b) adjusting the volume of the mold cavity $V_1$ in a mold at a mold temperature of from 80° C. to 120° C. to be equal to the volume of the molded article $V_0$, (c) injecting ultra high molecular weight polyethylene having volume $V_0$ into the molded cavity through a runner portion at a shear rate of at least 20,000 sec$^{-1}$, (d) instantaneously expanding the mold cavity to adjust its volume $V_1$ to satisfy the relation:

$$1.2\ V_0 \leqq V_1$$

at a time from $T_1$, immediately before completion of injection and time $T_2$ while there is a pressure difference between the cavity and the runner portion, and the ultra high molecular weight polyethylene in the runner portion has not solidified, and (e) compressing the volume of the mold cavity $V_1$ to satisfy the relation:

$$V_1 = V_0$$

while the ultra high molecular weight polyethlene in the mold cavity is still in a molten state.

2. A process according to claim 1 in which the mold cavity is expanded to make the volume of the mold cavity $V_1$ satisfy the relation:

$$1.4\ V_0 \leqq V_1.$$

3. A process according to claim 1 in which the mold cavity is expanded immediately after completion of injection.

4. A process according to claim 1 in which the mold comprises a mold having a cavity and a movable core being fitted into the cavity, and retreat of the core results in expansion of the mold cavity while advance of the core results in compression of the mold cavity.

5. A process according to claim 1 in which the mold is heated to a temperature which is lower than the melting point of the ultra high molecular weight polyethylene by 10° C. or more.

6. A process according to claim 1 wherein the shear rate is at least 50,000 sec$^{-1}$.

7. A process according to claim 1 wherein the polyethylene temperature is 170°–200° C.

* * * * *